United States Patent
Snyder, Sr. et al.

(10) Patent No.: US 7,500,699 B2
(45) Date of Patent: *Mar. 10, 2009

(54) CLAMPING MECHANICAL PIPE COUPLING DERIVED FROM A STANDARD FITTING

(75) Inventors: Ronald R. Snyder, Sr., Schnecksville, PA (US); Charles E. Wilk, Jr., Northampton, PA (US); Lawrence W. Thau, Jr., Flemington, NJ (US); Douglas R. Dole, Whitehouse Station, NJ (US); Terrance M. Carom, Allentown, PA (US)

(73) Assignee: Victaulic Company, Easton, PA (US)

( * ) Notice: Subject to any disclaimer, the term of this patent is extended or adjusted under 35 U.S.C. 154(b) by 1287 days.

This patent is subject to a terminal disclaimer.

(21) Appl. No.: 10/299,164

(22) Filed: Nov. 19, 2002

(65) Prior Publication Data

US 2003/0067170 A1  Apr. 10, 2003

Related U.S. Application Data

(63) Continuation-in-part of application No. 10/123,607, filed on Apr. 16, 2002, now Pat. No. 6,913,292, which is a continuation-in-part of application No. 10/007,951, filed on Dec. 3, 2001, now abandoned.

(60) Provisional application No. 60/262,820, filed on Jan. 19, 2001.

(51) Int. Cl.
*F16L 33/00* (2006.01)
(52) U.S. Cl. .................................................. 285/340
(58) Field of Classification Search ................ 285/340, 285/104, 105, 733.3, 148.6, 232, 417, 369, 285/342, 343, 321
See application file for complete search history.

(56) References Cited

U.S. PATENT DOCUMENTS 922,805 A   5/1909   Nelson et al.

(Continued)

FOREIGN PATENT DOCUMENTS

DE        36 31 547        4/1988

(Continued)

OTHER PUBLICATIONS

U.S. Appl. No. 10/299,281, filed Nov. 19, 2002, entitled Triple-Expanded Mechanical Pipe Coupling Derived From a Standard Fitting (Snyder Sr. et al); Projected Publication Date: Jan. 7, 2003.

*Primary Examiner*—Aaron M Dunwoody
(74) *Attorney, Agent, or Firm*—Synnestvedt & Lechner LLP (57) ABSTRACT

A coupling for joining pipe segments together is disclosed. The coupling is derived from a standard fitting and has a housing with a socket and a first expanded region adjacent to the socket and a second expanded region adjacent to the first expanded region. A sealing member is positioned in the first expanded region, a retainer is positioned in the second expanded region and a support washer having transversely oriented radial and coaxial flanges is positioned adjacent to the retainer. A clamping tab turned inwardly on the second expanded region overlaps the radial flange and clamps the support washer and retainer against a shoulder within the second expanded region thereby also capturing the sealing member within the coupling. The retainer has a plurality of radial teeth angularly oriented to engage a pipe and prevent its removal from the coupling. The teeth are twisted about their longitudinal axes.

17 Claims, 7 Drawing Sheets

U.S. PATENT DOCUMENTS

| | | | |
|---|---|---|---|
| 1,965,273 A | 7/1934 | Wilson | |
| 2,147,353 A | 2/1939 | Scholtes | |
| 2,201,372 A | 5/1940 | Miller | |
| 2,247,032 A | 6/1941 | Norton | |
| 2,479,960 A | 8/1949 | Osborn | |
| 2,508,914 A | 5/1950 | Graham | |
| 2,759,254 A | 8/1956 | Soehnlen et al. | |
| 2,779,610 A | 1/1957 | Risley | |
| 3,007,726 A | 11/1961 | Parkin | |
| 3,058,762 A | 10/1962 | Howe | |
| 3,312,483 A | 4/1967 | Leadbetter et al. | |
| 3,312,484 A | 4/1967 | Davenport | |
| 3,483,789 A | 12/1969 | Wurzel | |
| 3,582,112 A | 6/1971 | Pico | |
| 3,924,877 A | 12/1975 | Leopold, Jr. et al. | |
| 3,976,314 A | 8/1976 | Graham | |
| 3,995,897 A | 12/1976 | Paskert | |
| 4,047,743 A | 9/1977 | Weintraub et al. | |
| 4,072,328 A | 2/1978 | Elliott | |
| 4,073,514 A | 2/1978 | Pate | |
| 4,146,254 A | 3/1979 | Turner et al. | |
| 4,586,734 A | 5/1986 | Grenier | 285/340 |
| 4,593,943 A | 6/1986 | Hama et al. | |
| 4,610,468 A | 9/1986 | Wood | |
| 4,613,172 A * | 9/1986 | Schattmaier | 285/340 |
| 4,635,975 A | 1/1987 | Campbell | |
| 4,676,533 A | 6/1987 | Gerondale | |
| 4,744,412 A | 5/1988 | Kim et al. | |
| 4,747,626 A | 5/1988 | Hama et al. | |
| 4,749,214 A | 6/1988 | Hoskins et al. | |
| 4,834,428 A * | 5/1989 | Pritchatt | 285/345 |
| 4,842,306 A | 6/1989 | Zeidler et al. | |
| 4,911,406 A | 3/1990 | Attwood | |
| 4,919,457 A | 4/1990 | Moretti | |
| 5,029,908 A | 7/1991 | Belisaire | |
| 5,039,141 A | 8/1991 | Badoureaux | |
| 5,120,153 A * | 6/1992 | Valls | 403/305 |
| 5,160,175 A | 11/1992 | Yang | |
| 5,160,179 A | 11/1992 | Takagi | |
| 5,284,582 A | 2/1994 | Yang | |
| 5,295,697 A | 3/1994 | Weber et al. | |
| 5,603,530 A | 2/1997 | Guest | |
| 5,695,224 A * | 12/1997 | Grenier | 285/104 |
| 5,792,990 A * | 8/1998 | Piero | 174/86 |
| 5,816,627 A | 10/1998 | Readman | |
| 5,857,718 A | 1/1999 | Kleinschmidt | |
| 5,988,705 A | 11/1999 | Norkey | |
| 6,058,755 A | 5/2000 | Viegner | |
| 6,186,561 B1 | 2/2001 | Kaishio et al. | |
| 6,450,550 B1 | 9/2002 | Cornwell | |
| 6,464,266 B1 * | 10/2002 | O'Neill et al. | 285/340 |
| 6,499,771 B1 | 12/2002 | Snyder, Sr. et al. | |
| 6,517,124 B1 | 2/2003 | LeQuere | |
| 2002/0135184 A1 * | 9/2002 | Snyder et al. | 285/340 |
| 2002/0185868 A1 * | 12/2002 | Snyder et al. | 285/374 |
| 2003/0067170 A1 * | 4/2003 | Snyder et al. | 285/340 |
| 2003/0071460 A1 * | 4/2003 | Snyder et al. | 285/340 |

FOREIGN PATENT DOCUMENTS

| | | |
|---|---|---|
| DE | 297 21 759 | 5/1998 |
| DE | 297 21 760 | 5/1998 |
| EP | 0 922 896 | 12/1997 |
| JP | 9-329284 | 12/1997 |

* cited by examiner

CLAMPING MECHANICAL PIPE COUPLING DERIVED FROM A STANDARD FITTING

RELATED APPLICATION

This application is a continuation-in-part of U.S. application Ser. No. 10/123,607, filed Apr. 16, 2002, now U.S. Pat. No. 6,913,292, which is a continuation-in-part of U.S. application Ser. No. 10/007,951, filed Dec. 3, 2001, now abandoned which is based on and claims priority of U.S. Provisional Application No. 60/262,820, filed Jan. 19, 2001.

FIELD OF THE INVENTION

This invention relates to couplings for pipes and especially to mechanical couplings derived from standard fittings which effect a strong, reliable joint with a fluid-tight seal without the need for brazing or soldering.

BACKGROUND OF THE INVENTION

The construction of piping networks requires couplings that can form fluid-tight joints between pipe ends which can withstand external mechanical forces, as well as internal fluid pressure and reliably maintain the integrity of the joint. Many forms of joints are known, such as brazed or soldered joints, threaded joints, welded joints and joints effected by mechanical means.

For example, copper tubing, which is used extensively throughout the world to provide water service in homes, businesses and industry, is typically joined by means of couplings which are soldered to the pipe ends to effect a connection.

The use of copper tubing for piping networks is so widespread that standard tubing sizes have been established in various countries. For example, in the U.S., there is the ASTM Standard; in Germany, the DIN Standard; and in the United Kingdom, the British Standard (BS). Chart 1 below shows a portion of the range of outer diameters of the various standard copper tubes listed above.

CHART 1

Standard Outer Copper Tube Outer Diameters

| ASTM | DIN | BS |
| --- | --- | --- |
| ½" | 15 mm | 15 mm |
| ¾" | 22 mm | 22 mm |
| 1" | 28 mm | 28 mm |
| 1.25" | 35 mm | 35 mm |
| 1.5" | 42 mm | 42 mm |
| 2" | 54 mm | 54 mm |

Naturally, there are standard pipe fittings such as elbows (45° and 90°), tees and straight segments matched for use with the standard tube diameters. These standard fittings are defined in the U.S. by ASME Standard B16.22a-1998, Addenda to ASME B16.22-1995 entitled "Wrought Copper and Copper Alloy Solder Joint Pressure Fittings" dated 1998. The standard fittings have open ends with inner diameters sized to accept the outer diameter of a particular standard tube in mating contact for effecting a soldered joint.

In addition to the standard fittings described above, other components, such as valves, strainers, adapters, flow measurement devices and other components which may be found in a pipe network, will have a coupling which is compatible with the standard pipe, and it is understood that the term "coupling", when used herein, is not limited to a standard elbow, tee or other fitting but includes the open end of any component useable in a piping network which serves to couple the component to the pipe end.

A soldered joint is effected between a standard diameter tube end and its associated standard fitting by first cleaning the surfaces to be joined, typically with an abrasive such as a wire brush or steel wool, to remove any contaminants and the oxide layer which forms on the surfaces. Next, the cleaned surfaces are coated with a flux material, usually an acid flux, which further disrupts the oxide layer (especially when heated) and permits metal to metal contact between the fitting, the pipe end and the solder. The pipe end is next mated with the fitting thereby bringing the cleaned, flux coated surfaces into contact. The fitting and pipe end are then heated to the melting temperature of the solder, and the solder is applied to the interface between the tube and the fitting. The solder melts, flows between the surfaces of the pipe end and the fitting via capillary action and upon cooling and solidifying forms the solder joint. Excess flux is removed from the outer surfaces to prevent further acid etching of the pipe near the joint.

While the soldered joint provides a strong, fluid-tight connection between pipe end and fitting, it has several disadvantages. Many steps are required to make the soldered joint, thus, it is a time consuming and labor intensive operation. Some skill is required to obtain a quality, fluid-tight joint. Furthermore, the solder often contains lead, and the flux, when heated, can give off noxious fumes, thus, exposing the worker to hazardous substances which can adversely affect health over time. The joint is typically heated with an open gas flame which can pose a fire hazard, as well as a personal burn hazard.

To overcome these disadvantages, many attempts have been made to create mechanical couplings which do not require solder or flame to effect a strong, fluid-tight joint. Such mechanical couplings often use an over-sized opening accommodating an O-ring for sealing purposes and an annular retainer interposed between the outer diameter of the pipe end and the inner diameter of the coupling to mechanically hold the parts together. The retainer often has radially extending teeth which dig into the facing surfaces of the coupling and the pipe end to resist extraction of the pipe end from the coupling after engagement.

While these mechanical couplings avoid the above identified problems associated with soldered joints, they can suffer from one or more of the following disadvantages. To be effective, the retainer requires sufficient space within the coupling. Thus, the couplings tend to be oversized relatively to the pipes they are intended to receive, and if existing standard couplings are to be adapted for use with such a mechanical system, it is usually necessary to adapt a larger size standard fitting to a smaller size standard pipe. This is more expensive than adapting the standard fitting appropriate to the standard pipe in what is known as a "size-on-size" fitting. For example, a standard ¾ inch pipe fitting may be used to couple a ½ inch standard copper pipe in a mechanical system (not "size-on-size"). Furthermore, the retainer may not provide adequate pull-out strength, and the pipe end could be inadvertently separated from the coupling, for example, during a pressure spike within the pipe, caused by a sudden closing of a valve (the "water hammer effect") which places the joint under increased tension.

The retainer also does not help keep the pipe end coaxial with the coupling upon insertion, allowing the pipe end to tip and deform the retainer and gouge the inside surface of the coupling or an elastomeric seal, such as an O-ring. In such a mechanical joint, there is furthermore little or no resistance to axial rotation of the pipe relatively to the coupling (i.e., relative rotation of the pipe and coupling about the longitudinal axis of the pipe). Thus, valves or other items mounted on the pipe will tend to rotate. Mechanical joints with retainers also tend to have little resistance to bending, allowing the pipe too much angular free play and permitting the pipe to "walk" out of the joint under repeated reversed bending loads. Excessive free play also tends to disengage the teeth on one side of the retainer and deform the teeth on the other side, weakening the joint. Furthermore, use of an enlarged section to accommodate the retainer may cause energy loss impeding fluid flow if the fluid is forced to flow into a coupling having a larger cross-sectional area. In general, when mechanical couplings are designed to overcome the aforementioned inherent disadvantages, they tend to suffer from a high part count, making them relatively complex and expensive.

There is clearly a need for a mechanical pipe coupling which avoids the disadvantages of both soldered pipe fittings, as well as prior art mechanical fittings described above, and which can be derived from existing standard fittings and used with pipes appropriate to the standard fitting in a "size-on-size" association rather than using a larger size fitting to couple smaller diameter pipes together.

SUMMARY AND OBJECTS OF THE INVENTION

The invention concerns a pipe coupling comprising a housing having a socket with a diameter preferably sized according to a standard to receive a pipe end having a diameter also sized according to a standard to be compatible with the socket. Preferably, the standard is ASME Standard B16.22a-1998, although other standards, such as the British Standard and the German DIN standard, are also contemplated.

A first expanded region is positioned adjacent to one end of the socket, the first expanded region having a larger diameter than the socket and adapted to receive a sealing member, such as an elastomeric ring positionable therein for effecting a seal between the pipe coupling housing and the pipe end. The pipe coupling housing preferably comprises a stop surface positioned adjacent to the other end of the socket, the stop surface extending radially inwardly and being engageable with the pipe end to prevent the pipe end from passing through the pipe coupling.

A second expanded region is positioned adjacent to the first expanded region, the second expanded region preferably having a larger diameter than the first expanded region and adapted to receive a retainer positionable therein for retaining the pipe end within the pipe coupling housing. The second expanded region forms an open end of the housing for receiving the pipe end. A shoulder is positioned between the first and second expanded regions. A clamping tab is positioned at the open end in spaced relation to the shoulder. The clamping tab, which preferably comprises an annular lip extending circumferentially around the open end, extends substantially radially inwardly. The retainer has a radially extending retainer flange positionable between the shoulder and the clamping tab. The clamping tab is biasable toward the shoulder for clamping the retainer flange against the shoulder for holding the retainer within the second expanded region.

Preferably, the retainer adapted to interfit within the opening of the pipe coupling housing comprises an outer ring sized to circumferentially engage the second expanded region and a plurality of flexible, resilient, elongated teeth arranged circumferentially around the ring. Each of the teeth projects substantially radially inwardly from the outer ring along a plurality of respective longitudinal axes oriented angularly with respect to the plane of the outer ring. Preferably, each of the teeth are twisted angularly about their respective longitudinal axes. The teeth are engageable circumferentially with the pipe end for preventing movement of the pipe end outwardly from the coupling. In a preferred embodiment, each tooth is twisted angularly about its longitudinal axis in a direction opposite that of its neighboring teeth.

A support washer may also be positioned adjacent to the retainer. The support washer has a radially extending washer flange positionable between the retainer flange and either the shoulder or the clamping tab. The support washer has a radially inwardly facing surface having a diameter substantially equal to and coaxial with the socket diameter for circumferentially engaging and supporting the pipe end. The two-point support provided by the socket and the support washer provides substantial resistance to bending of the pipe within the coupling. The support washer preferably has a circumferential collar which supports the retainer against excessive deflections.

The invention also concerns a method of manufacturing a pipe coupling housing and a pipe coupling for receiving a pipe end. The method of making the housing comprises the steps of:

(A) providing a fitting having a socket;

(B) expanding a portion of the socket into a first expanded region having a larger inner diameter than the socket;

(C) expanding a portion of the first expanded region into a second expanded region having a larger inner diameter than the first expanded region.

The following steps use the coupling housing to form the coupling;

(D) positioning a sealing member preferably within the first expanded region;

(E) positioning a retainer preferably within the second expanded region;

(F) positioning a support washer preferably within the second expanded region;

(G) forming a clamping tab extending substantially radially inwardly at the open end of the fitting; and (H) biasing the clamping tab toward the socket for clamping the sealing member, the retainer and the support washer within the expanded regions.

Preferably, the socket is sized according to a standard.

It is an object of the invention to provide a mechanical pipe coupling which does not need to be soldered, brazed, welded, threaded or adhesively bonded to effect a joint.

It is another object of the invention to provide a standard mechanical pipe coupling which can be derived from existing standard pipe fittings.

It is still another object of the invention to provide a standard mechanical pipe coupling which can be used in a "size-on-size" association with an appropriate standard pipe for increased economy, improved fluid flow and compactness.

It is again another object of the invention to provide a standard mechanical pipe coupling which has substantial resistance to bending preventing excessive free play between pipe and coupling.

It is yet another object of the invention to provide a standard mechanical pipe coupling having a retainer which is clamped within the coupling to resist rotation.

These and other objects and advantages of the invention will become apparent upon consideration of the following drawings and detailed description of preferred embodiments of the invention.

DETAILED DESCRIPTION OF THE PREFERRED EMBODIMENT

Figure 1:
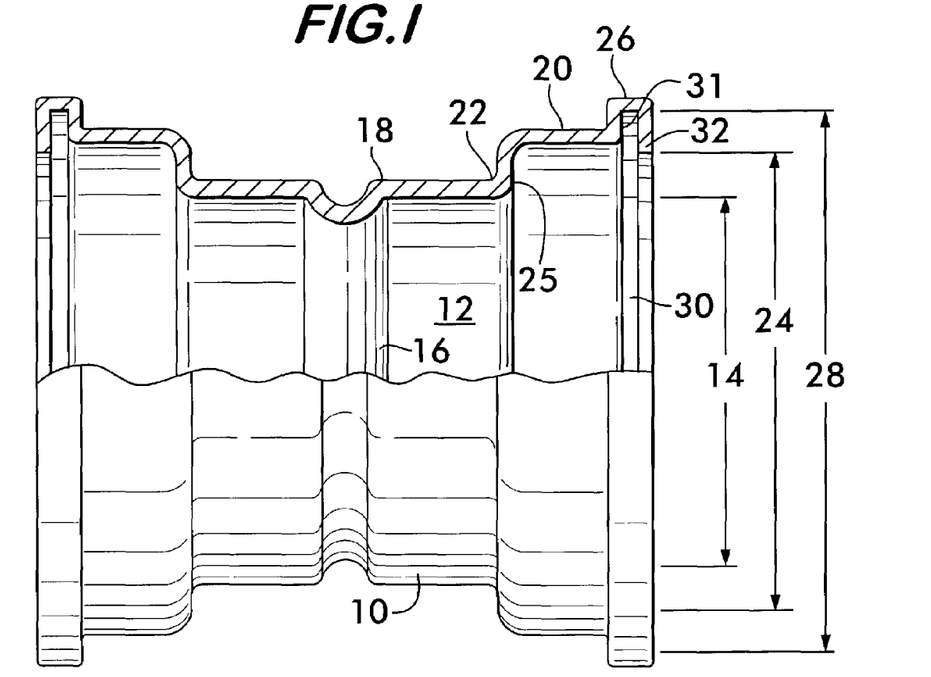
FIG. 1 is a partial longitudinal sectional view of a pipe coupling housing according to the invention.

FIG. 1 shows a pipe coupling housing 10 according to the invention having a socket 12 with an inner diameter 14 sized according to a standard to receive a pipe end sized, according to a compatible standard, to interfit within the socket 12. Preferably, coupling housing 10 is a modification of an existing standard pipe fitting, for example, an ASME Standard pipe fitting according to Standard number B16.22a-1998 for wrought copper and copper alloy solder joint pressure fittings. Fittings meeting the specification of other standards, such as the German DIN standard and the British BS standard, may also be modified to derive the coupling housing 10.

Figure 1A:
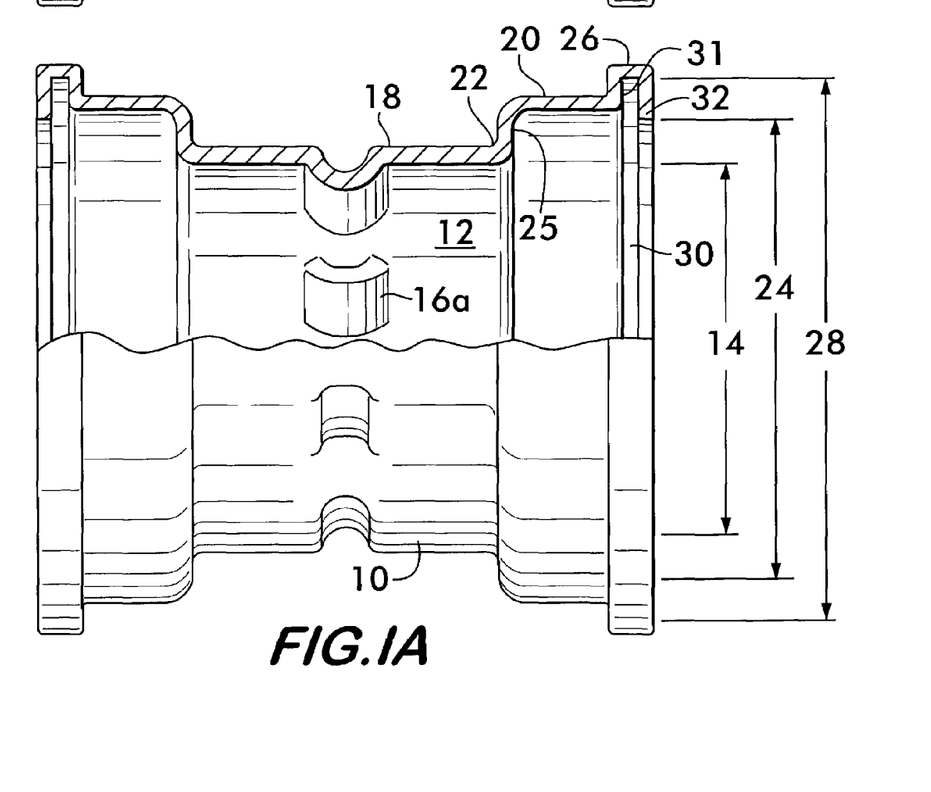
FIG. 1A is a partial longitudinal sectional view of an alternate embodiment of a pipe coupling housing according to the invention.

A stop surface 16 is positioned adjacent to one end 18 of the socket 12. Stop surface 16 extends radially inwardly and is, thus, engageable with an end of a pipe received within the socket to prevent the pipe end from passing through the coupling housing. Stop surface 16 is circumferentially continuous around housing 10, but may also be discontinuous as shown by stop surface 16a in FIG. 1A.

A first expanded region 20 is positioned at the other end 22 of the socket 12, the first expanded region having a larger inner diameter 24 than the socket inner diameter 14. A shoulder 25 is positioned between the socket 12 and the first expanded region 20. The diameter 24 of the first expanded region is sized to receive a sealing member, the sealing member being engageable with the shoulder as described below.

A second expanded region 26 is positioned adjacent to the first expanded region 20. Preferably, second expanded region 26 has a larger inner diameter 28 than the inner diameter 24 of the first expanded region 20 and is adapted to receive a retainer and a support washer, also described below. Second expanded region 26 forms an open end 30 of housing 10 for receiving a pipe end. A shoulder 31 is positioned between the first expanded region 20 and the second expanded region 26.

A clamping tab 32 is positioned at the open end 30 in spaced relation relatively to the shoulder 31. Clamping tab 32 is preferably in the form of an annular lip extending circumferentially around open end 30. The clamping tab 32 extends radially inwardly from the second expanded region 26 and is biasable toward shoulder 31 to engage the aforementioned retainer and support washer to clamp them against the shoulder 31 and hold them within the second expanded region 26, thereby also capturing the aforementioned sealing member within the coupling housing 10 as described in detail below.

Preferably, pipe coupling housing 10 is derived by die forming the socket of an existing standard pipe fitting to create the expanded regions 20 and 26, the clamping tab 32 being turned inwardly and biased toward the shoulder 31 in a later operation after internal components such as the aforementioned sealing member, retainer and support washer are inserted into the coupling housing 10 to form a coupling according to the invention described in detail below.

While any standard fitting may be used as a starting point, the invention is particularly advantageously used with the ASME standard fittings compatible with copper tubing having a nominal diameter between ½ and 2 inches. Similarly, the German and British standard fittings for copper tubing between 15 mm and 54 mm are also favored. It is understood that the invention is not limited for use with copper tube and could be applied to plastic or steel pipes and fittings for example. While it is advantageous to begin with a standard fitting from an economic standpoint, the coupling housing 10 could also be custom made for a particular application.

Figure 2:
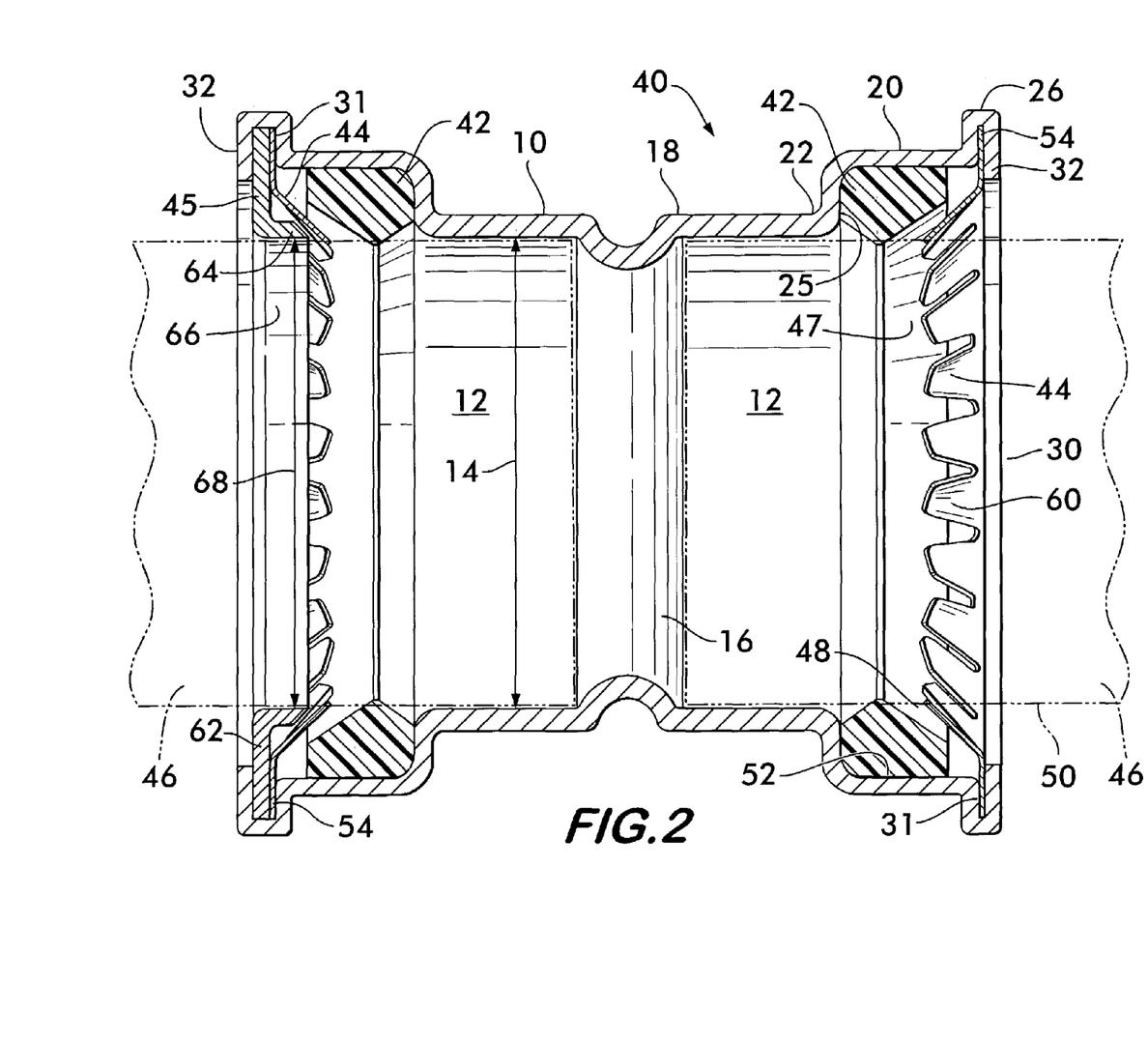
FIG. 2 is a longitudinal sectional view of a pipe coupling according to the invention.

FIG. 2 shows a pipe coupling 40 according to the invention assembled from its various components including pipe coupling housing 10, a sealing member 42, a retainer 44 and a support washer 45. A pipe end 46 is shown in phantom line received within the coupling 40. Pipe end 46 is preferably a standard pipe, compatible with ASME Standard B16.22a-1998, for example, and the coupling housing 10 is preferably formed from a fitting originally designed according to the same standard to receive the pipe end 46 and modified by the formation of the expanded regions 20 and 26, shoulders 25 and 31 and the clamping tab 32.

To realize economic advantage, it is preferable to modify a standard fitting intended originally for use with the diameter of the pipe end 46 and achieve a "size-on-size" relationship between the coupling and the pipe end. Size-on-size refers to the fact that the fitting being modified is for the size of pipe being coupled and not a fitting intended for a larger sized pipe which is then modified into a coupling which can take a smaller sized pipe.

As shown in FIG. 2, the inner diameter 14 of socket 12 is sized to receive and support the pipe end 46. Stop surface 16 engages pipe end to position it properly within coupling 40 and prevent it from passing through the coupling housing 10.

Figure 6:
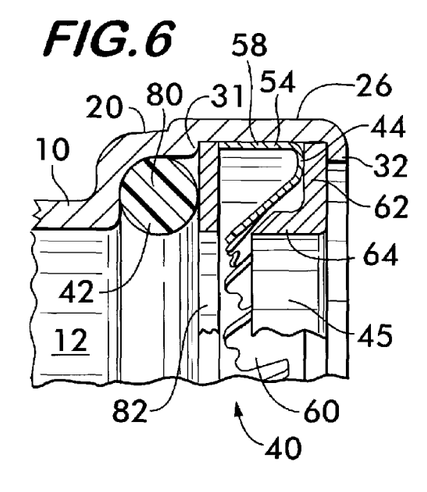
FIGS. 6 through 9 are partial longitudinal sectional views of various different embodiments of the coupling according to the invention.

Sealing member 42, positioned within the first expanded region 20 adjacent to socket 12, is preferably an elastomeric ring having an angularly oriented circumferential surface 47 sloping toward the open end 30 of the coupling housing 10. Sloping surface 47 acts as a lead-in and helps prevent the sealing member from being pinched between the pipe end and shoulder 25. The sloping surface 47 also acts as a guide to align the pipe end 46 with the socket 12 and thus helps protect the seal from insertion damage due to misalignment between the pipe end 46 and the coupling 40. The sloping surface 47 also causes a reduction in the insertion force required to seat a pipe end 46 into the coupling 40. Sealing member 42 may also be an O-ring as shown in FIG. 6, or any other type of sealing member which will effect a fluid-tight joint between the pipe end and the coupling.

A fluid-tight seal is effected between the coupling housing 10 and the pipe end 46 by compressing the sealing member 42 in the annular space 48 between the outer surface 50 of pipe end 46 and the inside surface 52 of the first expanded region 20. Sealing member 42 seats against shoulder 25 which prevents it from moving deeper into the coupling housing 10 when pipe end 46 is inserted through opening 30 to engage the sealing member and be received in socket 12.

Retainer 44 comprises a circumferential retainer flange 54 sized to fit within the second expanded region 26 of coupling housing 10. Retainer flange 54 extends radially outwardly from the retainer 44 and is positioned between shoulder 31 and clamping tab 32. When only the retainer 44 is present, as shown on the right hand side of FIG. 2, the retainer flange is clamped between the clamping tab 32 and the shoulder 31, the clamping tab 32 being biased toward the shoulder 31 to engage the retainer flange 54.

Figures 3, 4:
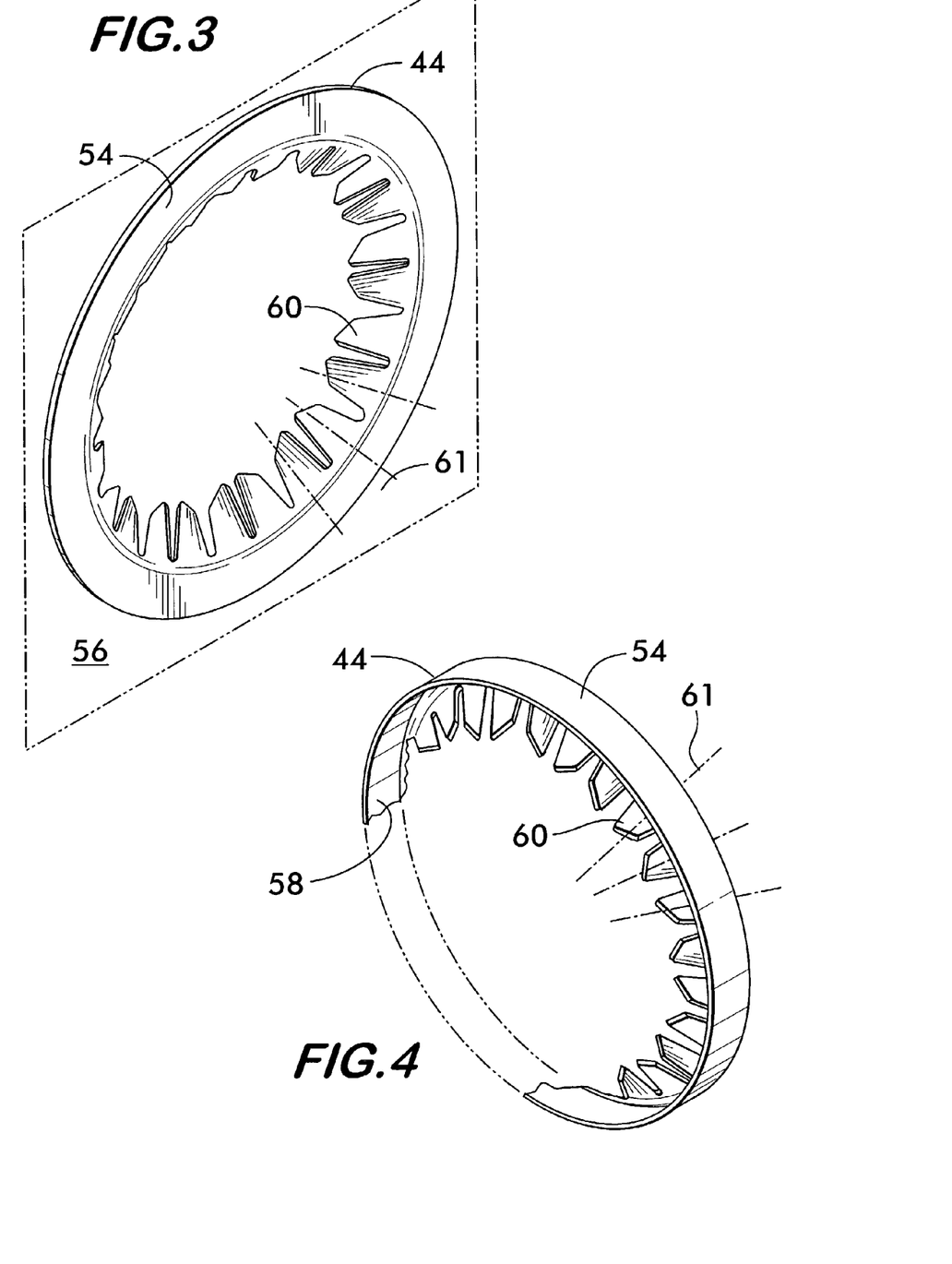
FIG. 3 is a perspective view of a retainer according to the invention.
FIG. 4 is a perspective view of an alternate embodiment of a retainer according to the invention.
Figure 3A:
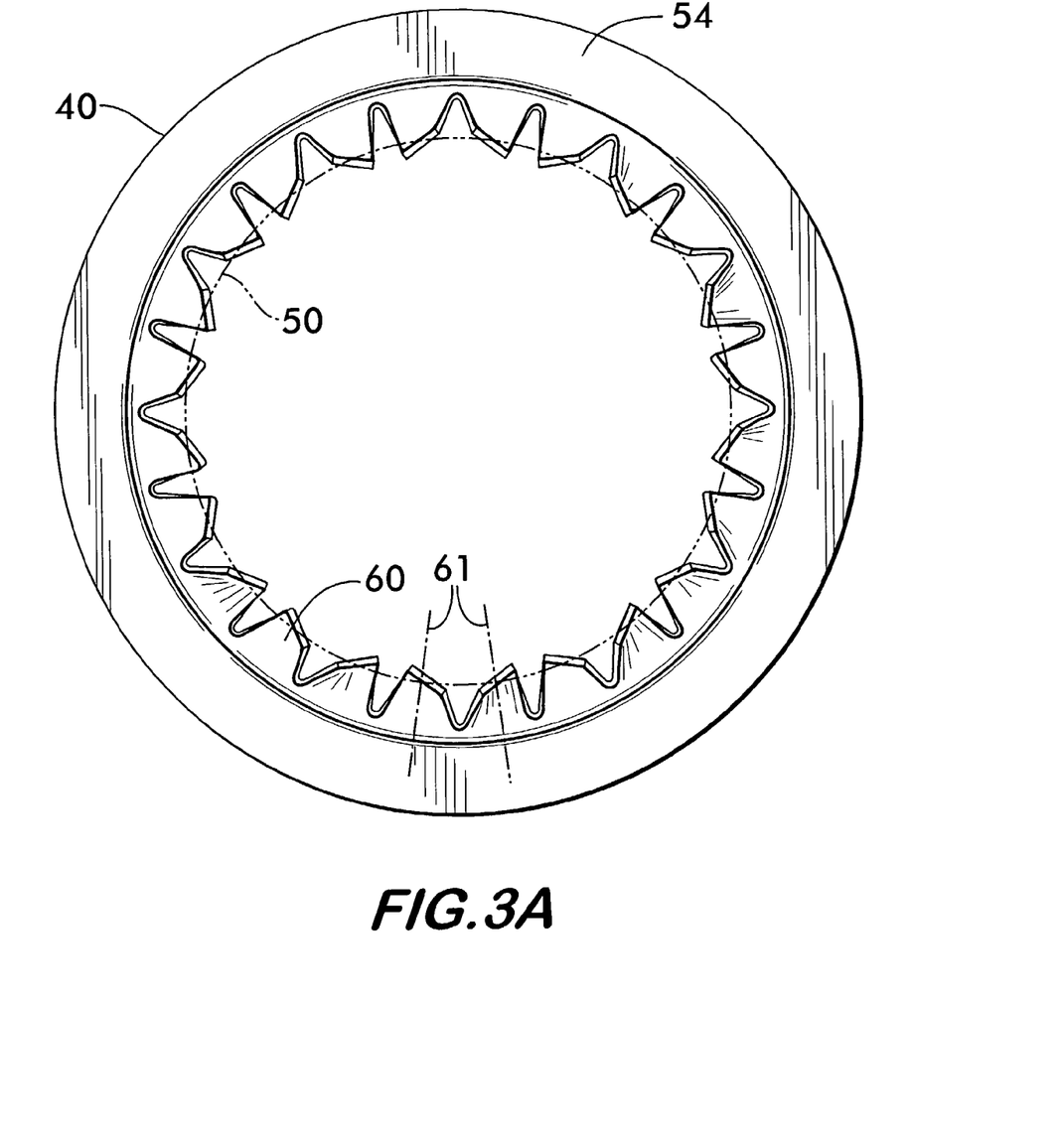
FIG. 3A is a plan view of the retainer shown in FIG. 3.

Retainer 44, shown in detail in FIGS. 3 and 3A, has a plurality of flexible, resilient teeth 60 which are arranged circumferentially around the retainer flange 54 and project substantially radially inwardly thereof. Teeth 60 are angularly oriented out of the plane 56 of the retainer flange 54 allowing the retainer 44 to be positioned within the coupling housing 10 with teeth 60 pointing in a direction away from opening 30 (see FIG. 2). Teeth 60 are resiliently biased to engage outer surface 50 of pipe end 46. The angular orientation of teeth 60 allows the pipe end 46 to be received within opening 30 and pass through the retainer 44 and the sealing member 42 into socket 12 and seat against stop surface 16 but prevent withdrawal of the pipe end 46 outwardly from the coupling. Outward motion of the pipe end will tend to simultaneously compress and rotate the teeth inwardly thereby causing them to dig into the pipe outer surface 50 and retain the pipe within the coupling in a self-jamming manner such that, as greater force is applied to withdraw the pipe from the coupling the teeth 60 dig further and exert proportionally greater force to resist the outward motion until they bend or buckle.

As further shown in FIGS. 3 and 3A, each tooth 60 of retainer 44 is preferably twisted angularly about its longitudinal axis 61. Preferred angles of twist range between about 2° and about 50°. Preferably, each tooth is twisted in a direction opposite that of its neighboring teeth. The twist inhibits relative rotation between the retainer 44 and the pipe end 46. The clamping action of the shoulder 31 and the clamping tab 32 against the retainer flange 54 resist relative rotation of the retainer within the housing 10. Together, the twist of teeth 60 and the clamping action of the clamping tab 32 inhibit relative rotation between the pipe end 46 and the coupling housing 10. Thus, valves or other items mounted on plain end pipe (i.e., pipe ends having no grooves or other modifications) by means of the coupling 40 will be less likely to rotate into an inconvenient or inaccessible position where they become difficult or impossible to actuate or service.

Preferred materials for the retainer 44 include stainless steel to prevent corrosion, beryllium-copper alloys for excellent flexibility and strength, as well as other resilient, flexible metals. Engineering plastics are also feasible primarily but not exclusively for plastic pipe applications.

Figure 3B:
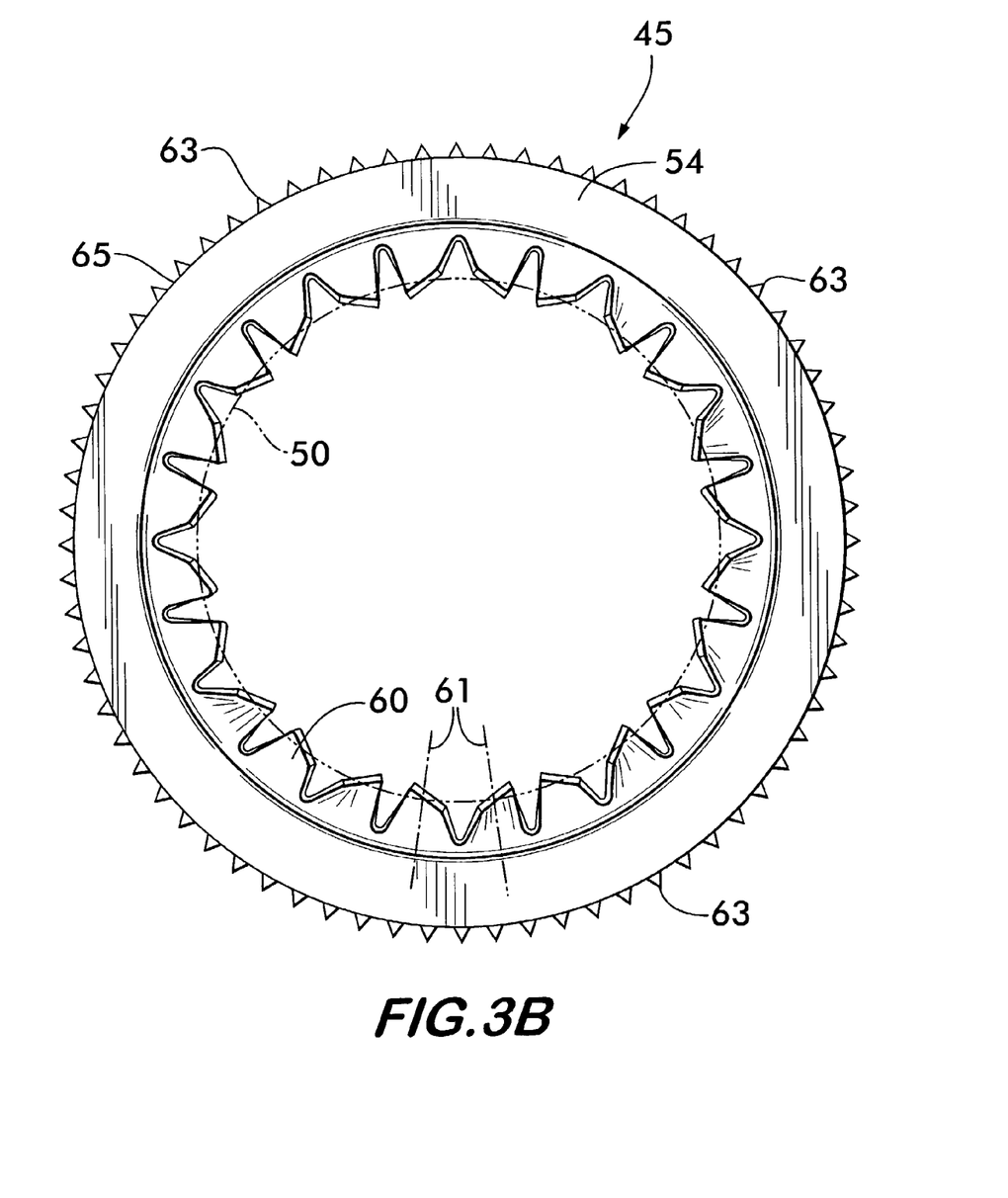
FIG. 3B is a plan view of an alternate embodiment of a retainer according to the invention.

FIG. 3B shows another embodiment of a retainer 45. Retainer 45 comprises a retainer flange 54 and a plurality of resilient teeth 60 arranged circumferentially around the retainer flange 54. Teeth 60 project substantially radially inwardly and are oriented out of the plane of the retainer flange 54 as described for the other retainer embodiments. Teeth 60 may be substantially straight or may be twisted about longitudinal axes 61 as illustrated in the figure, preferably in an alternating pattern. Projections 63 are arranged circumferentially around the perimeter 65 of retainer flange 54, the projections extending radially outwardly and digging into the inner surface of the coupling housing in which the retainer 45 is positioned. The projections 63 increase the retainer's resistance to rotation within the coupling and also increase the pull-out strength of the pipe end engaged by the retainer teeth 60.

Figure 7:
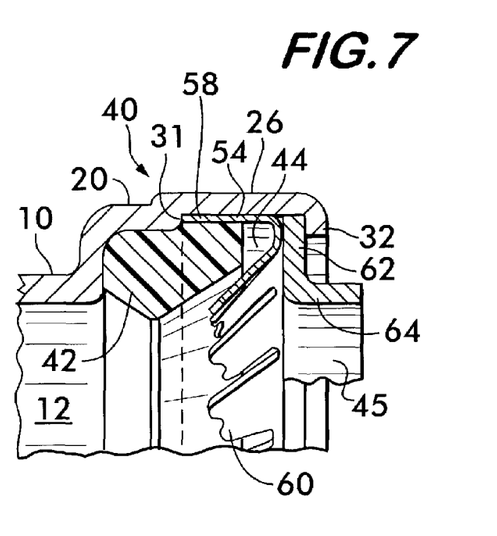
Figure 8:
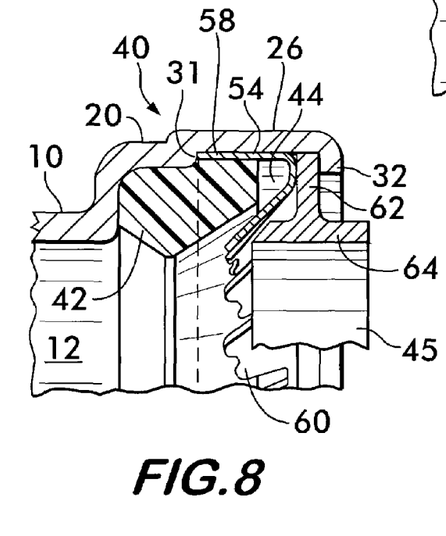
Figure 9:
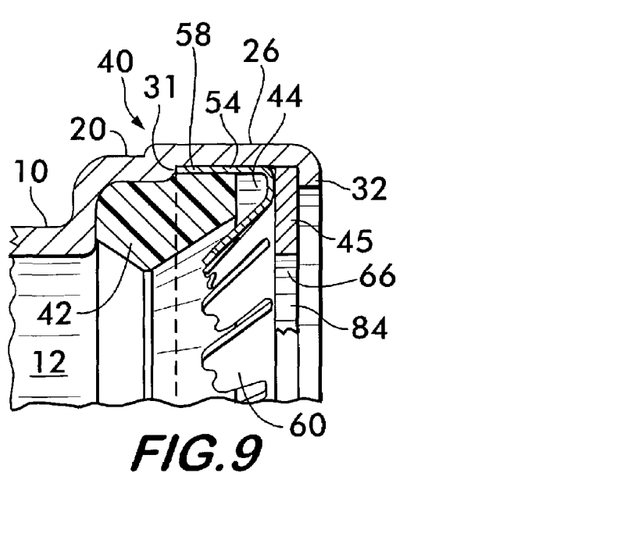

In an alternate embodiment shown in FIG. 4, retainer flange 54 may also comprise a circumferential ring 58 extending around the retainer 44. Teeth 60 are again angularly oriented out of the plane of the ring 58, and each one is twisted about its longitudinal axis 61, preferably in an alternating pattern, with each tooth twisted in a direction opposite that of its neighbors. Ring 58 is intended to stiffen the retainer, may take on virtually any cross sectional configuration, and may also be effectively clamped between the shoulder 31 and the clamping tab 32 to secure the retainer within the coupling as illustrated in FIGS. 7 through 9.

Support washer 45, best shown on the left side of coupling 10 in FIG. 2, preferably comprises a radially oriented circumferential washer flange 62 and a collar 64, also circumferential, but oriented transversely to the radial washer flange 62. Thus, support washer 45 has an "L"-shaped cross-section as shown which provides excellent torsional stiffness for support of the pipe end as described below. Washer flange 62 is in overlapping relation with and engages the retainer flange 54. Washer flange 62 is engaged by either the shoulder 31 or clamping tab 32 and thereby retained within the second expanded region 26 along with the retainer flange 54 by the clamping action of the clamping tab 32 and the shoulder 31. Preferably, as shown in FIG. 2, washer flange 62 is positioned between the clamping tab 32 and retainer flange 54 allowing the collar 64 to extend inwardly of the pipe coupling housing 40 to support the teeth 60 against excessive deflection. By continuously supporting the teeth circumferentially around the coupling, the pull-out force required to remove the pipe end 46 from the coupling is increased because the teeth 60, when supported by the collar 64, will bend or buckle at a significantly higher load than when unsupported.

The collar 64 forms an inwardly facing surface 66 having an inner diameter 68 substantially equal to and coaxial with the inner diameter 14 of the socket 12. Together, the socket 12 and surface 66 engage and support the pipe end 46 when it is inserted into the coupling housing, the surface 66 and socket 12 providing a "two-point" support over a substantial length of the coupling housing. This two-point support afforded by the surface 66 and socket 12 provides substantial resistance to bending of the pipe end 46 within the coupling housing 10 and reduces free play of the pipe end. Increased bending stiffness and reduced free play help to ensure a reliable fluid-tight joint between the coupling 40 and the pipe end 46 which will not leak or come apart under repeated bending loads. Furthermore, the increased joint stiffness allows the same hanger spacing for mounting the pipe as used in a soldered joint system.

Preferred materials for the support washer 45 include stainless steel to prevent corrosion, beryllium-copper alloys for galvanic compatibility with copper, copper alloys, as well as high strength engineering plastics.

Figure 5:
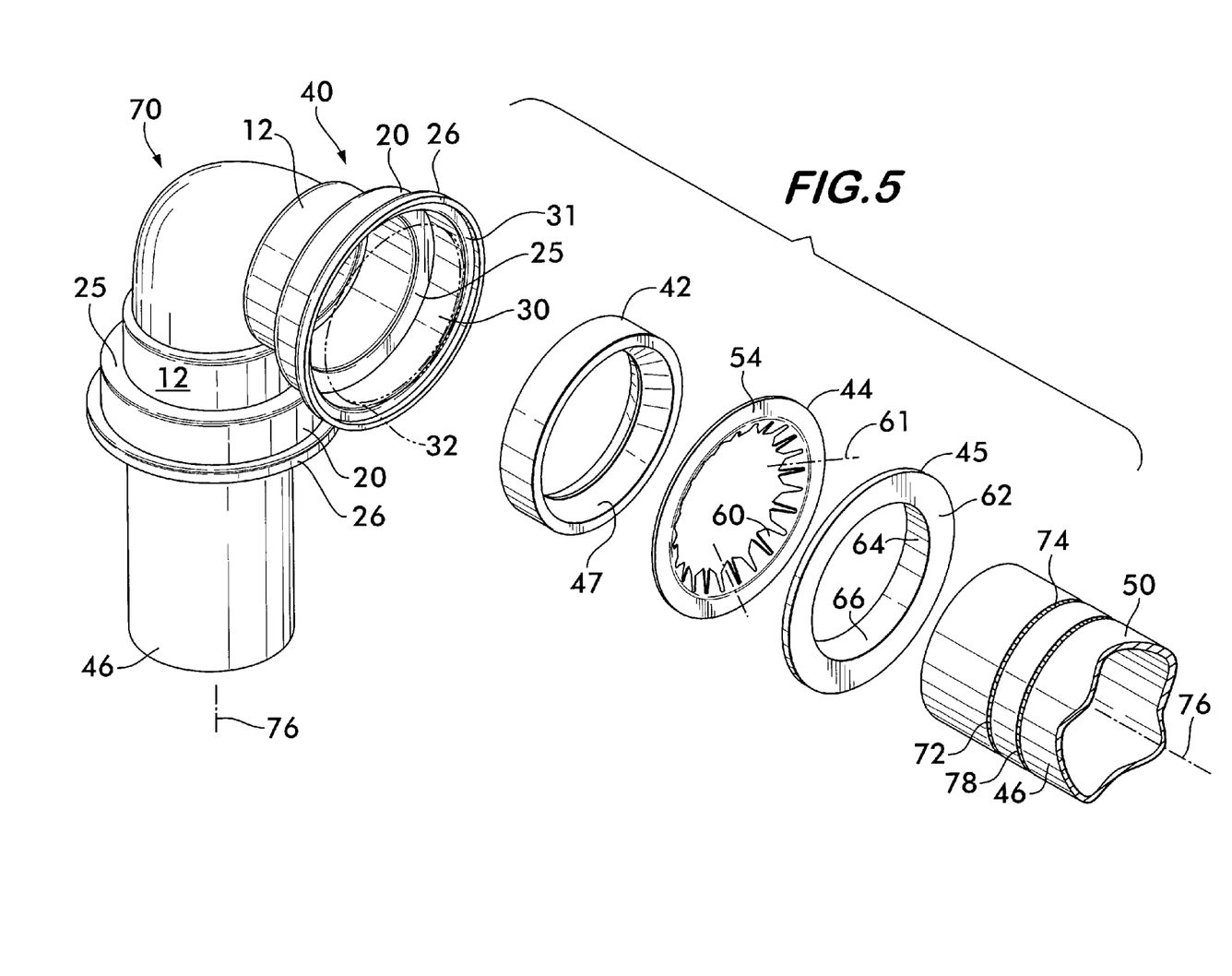
FIG. 5 is an exploded perspective view of a pipe coupling in the form of an elbow fitting according to the invention.

FIG. 5 shows an elbow fitting 70 comprising a pipe coupling 40 according to the invention. As noted above, in addition to the straight through and elbow type couplings illustrated, any type fitting, such as a tee fitting, a fitting forming part of a valve, a sprinkler head, a filter or any other mechanical component, may be adapted to use a coupling according to the invention.

FIG. 5 presents an exploded view which is useful to describe how a coupling according to the invention is manufactured and used. Preferably, elbow fitting 70 begins as a standard fitting, for example, a standard ASME wrought copper or copper alloy solder joint pressure fitting according to ASME Standard B16.22a-1998 having a socket 12 sized to receive pipe end 46. Portions of the socket 12 are expanded, preferably by die-forming, into a first and a second expanded region 20 and 26. Shoulders 25 and 31 are formed in the process of creating the expanded regions 20 and 26. Next, sealing member 42 is positioned within the first expanded region 20, engaging shoulder 25. Retainer 44 is then positioned adjacent to the sealing member 42 in the second expanded region 26, its flange 54 engaging shoulder 31. Support washer 45 is next positioned adjacent to retainer 44 with collar 64 facing inwardly towards socket 12 and providing support to teeth 60 on retainer 44. Washer flange 62 is in overlying engagement with retainer flange 54. After the components are inserted and properly seated within the expanded regions, the clamping tab 32, shown in phantom line, is formed by turning a portion of the second expanded region 26 radially inwardly to engage washer flange 62 of support washer 45 and clamp the washer flange 62 and the retainer flange 54 against the shoulder 31, thereby capturing the sealing member 42 within the coupling 40. Clamping tab 32, preferably in the form of an annular lip extending circumferentially around the coupling 40, is biased toward the shoulder 31 or the socket 12 and forms the opening 30 for receiving pipe end 46.

Coupling 40 thus formed is ready to receive a pipe end 46 in sealing engagement. Pipe end 46 may have a groove 72 cut or cold-formed in its outer surface 50 to engage teeth 60 of retainer 44 and provide additional gripping force preventing inadvertent separation of the pipe end from the fitting 70. The groove 72 may have knurling 74 or be otherwise textured to engage teeth 60 and prevent or at least inhibit rotation of the pipe end relative to the retainer. As described above, teeth 60 may be twisted about their respective longitudinal axes 61 to further help prevent or inhibit rotation of the pipe end 46 relatively to the retainer 44. Together, knurling 74, twisted teeth 60 and the clamping action of the clamping tab 32 help inhibit rotation of the pipe end 46 about its long axis 76 relative to the fitting 70. Thus, valves or other items mounted on the pipe by means of the coupling 40 will be less likely to rotate into an inconvenient or inaccessible position where they become difficult or impossible to actuate or service.

An additional groove 78 may also be formed in the pipe end 46 in spaced relation to the groove 72. The groove spacing is designed such that groove 78 aligns with flange 62 when the pipe end 46 is inserted into the coupling 40 to a depth sufficient for teeth 60 on retainer 44 to engage groove 72. Groove 78, thus, provides a visual indicator which allows the technician installing the pipe to immediately verify that the pipe end 46 is properly engaged with the coupling 40 to form a fluid-tight joint.

Plain end pipe (i.e., pipe ends having no grooves 72 or other modifications to increase pull-out strength) may also have a groove 78 or other form of witness mark, such as a score line, printed indicia and the like, which is positioned in spaced relation to the end of the pipe such that, when the witness mark aligns with flange 62, the pipe end 46 is seated against the stop surface 16. The witness mark provides visual confirmation that the pipe end is properly and fully engaged with the coupling.

FIGS. 6-9 illustrate alternate embodiments of the pipe coupling according to the invention. In FIG. 6, coupling housing 10 has a sealing member 42 formed by an O-ring 80 positioned within the first expanded region 20. A washer 82 is positioned adjacent to the O-ring, preferably in the second expanded region 26. Retainer 44 is adjacent to the washer 82 also in the second expanded region 26. Support washer 45 has collar 64 for providing support to teeth 60 on the retainer 44. Clamping tab 32 is in overlapping relation with washer flange 62 to clamp the support washer 45, retainer 44 and washer 82 within the coupling housing 10. Washer 82 supports the O-ring 80.

FIG. 7 shows an embodiment of a coupling 40 wherein the collar 64 of the support washer 45 extends outwardly from the coupling housing 10 rather than inwardly toward the socket 12. This configuration provides the advantage of extending the length over which the coupling engages the pipe end, thus, further increasing the bending stiffness of the joint. Second expanded region 26 is longer and shoulder 31 is shallower to accommodate flange 54 of retainer 44, which is the stiffening ring type 58 illustrated in FIG. 4. Clamping tab 32 is biased toward socket 12 and engages the washer flange 62 and clamps the washer flange and the retainer flange 58 against the shoulder 31.

FIG. 8 shows a coupling 40 having a support washer 45 with a T-shaped cross section wherein the collar 64 extends both inwardly and outwardly from the housing 10. The extended collar of this embodiment provides both the increased bending stiffness of the embodiment of FIG. 7, as well as the support for teeth 60 of retainer 44, thereby providing higher pull-out loads for the pipe end. Stiffening ring flange 58 is in contact radially with sealing member 42.

FIG. 9 shows an embodiment of coupling 40 wherein the support washer 45 comprises a simple flat washer, the inner diameter 84 of the washer forming the inwardly facing surface 66 for support of the pipe end 46 as described above. Clamping tab 32 engages the support washer 45 to clamp it and the retainer flange 58 within the second expanded region 26.

Couplings according to the invention provide a mechanical pipe coupling which can form a reliable fluid-tight joint without the hazards associated with brazing, welding or soldering while taking advantage of existing standard fittings in a size-on-size relationship with standard pipe to achieve significant economical advantage.

What is claimed is:

1. A pipe coupling sealingly engageable with a pipe end, said pipe coupling comprising:
    a coupling housing having a socket with a diameter sized to receive and circumferentially support said pipe end;
    a first expanded region positioned adjacent to one end of said socket, said first expanded region having a larger diameter than said socket;
    a sealing member positioned in said first expanded region to effect a seal between said pipe coupling and said pipe end;
    a second expanded region positioned adjacent to said first expanded region, said second expanded region forming an open end of said coupling housing for receiving said pipe end, a shoulder being positioned between said first and second expanded regions;
    a retainer positioned within said second expanded region and being engageable circumferentially with said pipe end for retaining said pipe end within said pipe coupling, said retainer having a circumferential retainer flange; and
    a clamping tab attached to said coupling housing and positioned at said open end, said clamping tab extending substantially radially inwardly in spaced relation to said shoulder and being biased toward said shoulder and clamping said retainer flange between said clamping tab and said shoulder for holding said retainer within said coupling housing.

2. A pipe coupling housing according to claim 1, wherein said clamping tab comprises an annular lip extending circumferentially around said open end.

3. A pipe coupling housing according to claim 1, wherein said second expanded region has a larger diameter than said first expanded region.

4. A pipe coupling housing according to claim 1, further comprising a support washer positioned within said second expanded region for supporting said pipe end, said support washer having a substantially radially extending washer flange positioned between said retainer flange and one of said shoulder and said clamping tab, said washer flange and said retainer flange being clamped between said clamping tab and said shoulder for holding said retainer and said support washer within said second expanded region.

5. A pipe coupling according to claim 4, wherein said support washer has a radially inwardly facing surface having a diameter substantially equal to said socket diameter and coaxial therewith, said inwardly facing surface being circumferentially engageable with said pipe end upon insertion of said pipe end into said pipe coupling, said pipe end being supportable by said socket and said inwardly facing surface of said support washer.

6. A pipe coupling according to claim 5, wherein said support washer comprises a circumferential collar arranged transversely to said washer flange, said circumferential collar being substantially coaxial with said socket and forming said inwardly facing surface for supporting said pipe end.

7. A pipe coupling according to claim 6, wherein said circumferential collar extends outwardly from said open end of said coupling housing.

8. A pipe coupling according to claim 6, wherein said circumferential collar extends inwardly of said pipe coupling toward said retainer for providing support thereto.

9. A pipe coupling according to claim 6, wherein said circumferential collar extends outwardly from said open end of said coupling housing.

10. A pipe coupling according to claim 1, compatible with copper tubing having a nominal diameter between ½ inch and 2 inches inclusive.

11. A pipe coupling according to claim 1, compatible with copper tubing having a diameter between 15 mm and 54 mm inclusive.

12. A pipe coupling according to claim 1, wherein said coupling comprises an elbow fitting.

13. A pipe coupling according to claim 1, wherein said sealing member comprises an elastomeric ring sized to be compressible between said second expanded region and said pipe end thereby effecting said seal.

14. A pipe coupling according to claim 1, wherein said retainer comprises a plurality of flexible, resilient, elongated teeth arranged circumferentially around said retainer flange, each of teeth projecting substantially radially inwardly from said retainer flange along a plurality of respective longitudinal axes angularly oriented toward said socket, each of said teeth being twisted angularly about their respective longitudinal axes, said teeth being engageable circumferentially with said pipe end for retaining said pipe end within said pipe coupling.

15. A pipe coupling according to claim 14, wherein each said tooth is twisted angularly about its longitudinal axis in a direction opposite that of its neighboring teeth.

16. A pipe coupling according to claim 14, wherein said support washer comprises a circumferential flange and a circumferential collar arranged transversely to said circumferential flange, said circumferential flange being oriented substantially radially and positioned between said retainer flange and said clamping tab, said circumferential collar being substantially coaxial with said socket and extending inwardly of said pipe coupling toward said socket, said circumferential collar supporting said teeth against deflection.

17. A pipe coupling according to claim 14, wherein said teeth have a predetermined length so as to interfit within a groove formed circumferentially around said pipe end when said pipe end engages said socket, said teeth being engageable with said groove to increase resistance to movement of said pipe outwardly from said coupling.

* * * * *

UNITED STATES PATENT AND TRADEMARK OFFICE
CERTIFICATE OF CORRECTION

PATENT NO. : 7,500,699 B2  Page 1 of 1
APPLICATION NO. : 10/299164
DATED : March 10, 2009
INVENTOR(S) : Ronald R. Snyder, Sr. et al.

It is certified that error appears in the above-identified patent and that said Letters Patent is hereby corrected as shown below:

Claim 14, column 12, line 13, add --said-- between the words "of" and "teeth".

Signed and Sealed this

Second Day of June, 2009

JOHN DOLL
*Acting Director of the United States Patent and Trademark Office*